April 13, 1954   F. S. MALICK   2,675,513
MAGNETIC AMPLIFIER MOTOR CONTROL DEVICE
Filed June 4, 1953   4 Sheets-Sheet 1

INVENTOR.
FRANKLIN S. MALICK
BY

April 13, 1954  F. S. MALICK  2,675,513
MAGNETIC AMPLIFIER MOTOR CONTROL DEVICE
Filed June 4, 1953  4 Sheets-Sheet 2

INVENTOR.
FRANKLIN S. MALICK
BY
Arthur R. Woodfork

INVENTOR.
FRANKLIN S. MALICK
BY
Arthur R. Woolfolk

INVENTOR.
FRANKLIN S. MALICK
BY
Arthur R. Woolfolk

Patented Apr. 13, 1954

2,675,513

UNITED STATES PATENT OFFICE 2,675,513

MAGNETIC AMPLIFIER MOTOR CONTROL DEVICE

Franklin S. Malick, Milwaukee, Wis.

Application June 4, 1953, Serial No. 359,472

14 Claims. (Cl. 318—347)

This invention relates to motor control devices.

In motor control devices as heretofore constructed, thermionic tubes have been used but they have not been wholly satisfactory. They are relatively fragile and do not lend themselves either for instant starting as they require a warm-up period, nor do they lend themselves to overload for even slight overloads for short periods will ruin most of the commonly employed commercial control tubes, nor do they accommodate themselves for wide variations in line voltage nor material changes in ambient temperature.

This invention is designed to overcome the above noted defects and objects of this invention are to provide motor control devices which do not employ any tubes whatsoever, which are unaffected by variations in line voltage over very wide ranges, which will withstand high overloads for relatively long periods, not measured in seconds, but measured in minutes, in which the motor has a high starting torque and has instant and rapid acceleration to the desired speed, which requires no warm-up period, which does not require waste of energy as in the stand-by periods as is required in thermionic tubes, and to provide a device which will withstand shock and vibration and which does not have any delicate parts and which will operate with perfect efficiency at wide ambient temperature ranges.

As contrasted with electronic motor control devices this invention provides a motor control device which utilizes magnetic amplifiers and which will have in comparison with electronic tubes a substantially unlimited life, which will allow for line voltage variations as much as plus or minus 15%, which even allows the motor speed to be reduced to the lowest value desired and nevertheless maintains substantially constant speed for a change of load from zero load to 200% load, and which maintains substantially constant speed also for the high speed ranges.

In greater detail objects of this invention are to provide a motor control device employing magnetic amplifiers in which a very small per cent of energy is utilized in the control of the amplifiers, in which relatively small size magnetic amplifiers, are employed as most of the power is obtained from a simple variable transformer source in conjunction with the amplifier.

A further specific object of this invention is to provide motor control devices which operate over their linear range both at low voltage and low speeds and at high voltages and at high speeds, and to provide means whereby adjustments may be had to determine the lineality of the torque-load curves of the motor independently at the low or high speed ends so that appropriate adjustments may be made for any desired condition independently at both ends of the speed range.

Further objects are to provide a motor control device in which a reference voltage is balanced against or compared with the voltage across the brushes of a direct current motor and in which the magnetic amplifier has control means responsive to the load imposed on the motor to control the supply voltage for the motor and has control means responsive to the difference between the reference voltage and the voltage across the motor brushes.

A specific object of this invention is to provide a novel arrangement of motor control in which magnetic amplifiers are provided for controlling the motor as hereinabove set forth but in which simple types of transformers and rectifiers are employed for furnishing the major part of the power for the motor.

Further objects are to provide motor control devices which are reliable in operation, which are very sturdy, and which may be economically manufactured.

Embodiments of the invention are shown in the accompanying drawings in which.

Figure 1:
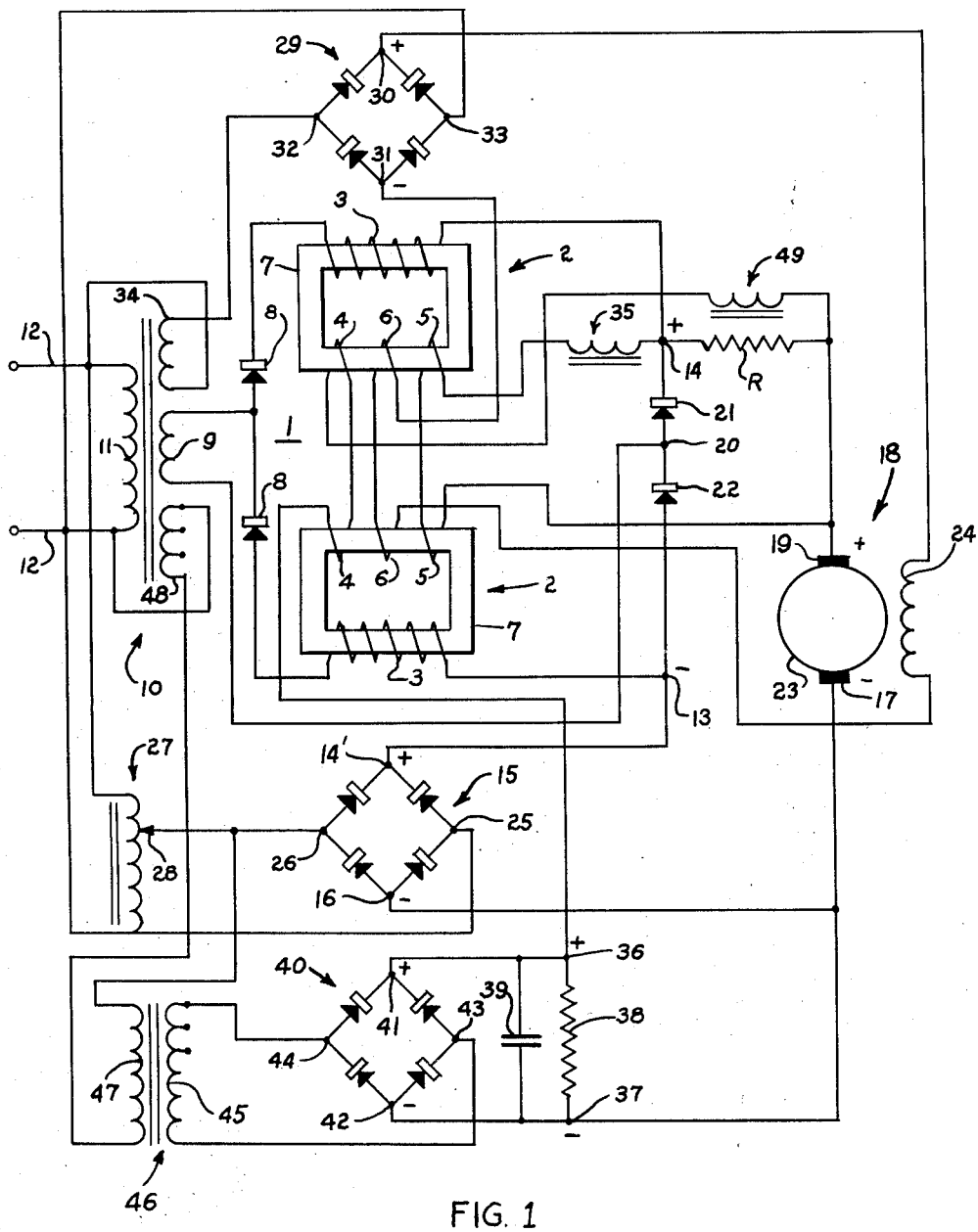
Figure 1 is a diagrammatic view showing one form that the invention may take such view showing a single control means.

Referring to Figure 1, it will be seen that the device comprises a magnetic amplifier indicated generally by the reference character 1 which is composed of a pair of saturable reactors 2, 2. The saturable reactors are of the self-saturating type and each is provided with a power winding 3, a first control winding 4, a second control winding 5 and a bias winding 6. The core structures of the reactors are indicated by the reference character 7, 7. The power winding is directly connected through a pair of rectifiers 8, 8 with one side of the secondary 9 of a power transformer indicated generally by the reference character 10. This power transformer is provided with a primary 11 connected to the power line 12, 12. The other side of the secondary 9 is connected to one of the input terminals 20 of the magnetic amplifier. The output terminals of such amplifier are indicated by the reference characters 13 and 14. The terminal 13 constitutes the negative terminal and the terminal 14 the positive terminal of the magnetic amplifier. The negative terminal 13 is connected to the positive terminal 14' of a main bridge rectifier indicated generally by the reference character 15. The negative terminal 16 of the main bridge or power rectifier 15 is connected to the negative brush 17 of a direct current motor indicated generally by the reference character 18. The other brush 19 of the direct current motor is connected through a resistor R of small value with the positive terminal 14 of the magnetic amplifier. The lower side, as shown in Figure 1, of the secondary 9 of the power transformer 10 is connected to the center point 20 between the rectifiers 21 and 22.

The armature of the direct current motor 18 is indicated by the reference character 23 and its field by the reference character 24.

It will be seen from the description thus far given that the energy for the motor, exclusive of the field, is furnished jointly by the magnetic amplifier and by the power transformer 27. The main rectifier has its A. C. terminals 25 and 26 connected respectively, to one end of a power transformer 27 and to a movable member 28, the opposite ends of the power transformer are connected to the line 12, 12. This power transformer can be of any type. It has been shown as an auto transformer. This auto transformer is a variable transformer, its moving member being indicated by the reference character 28 and being connected to the terminal 26 of the power rectifier 15.

The field 24 of the motor is supplied from an independent and relatively small bridge type rectifier 29 whose positive and negative output terminals 30 and 31 are connected so as to furnish current to the field 24 and to the bias windings 6 of the magnetic amplifier. The alternating or input terminals 32 and 33 of the field or bias rectifier 29 are connected respectively to one side of a secondary 34 of the transformer 10 and to one side of the line, the other side of the line being connected to the other side of the secondary 34. Thus the rectifier 29 supplies both the field of the motor and the bias windings 6 of the magnetic amplifier.

It is to be noted that the resistor R is connected in series with the motor, that is to say, with the motor armature so that the entire power current for the motor flows through the resistor R. The voltage across the resistor therefore, is an indication of the current flowing through the motor. Opposite ends of the resistor R are connected through a smoothing choke 35 to the field control winding 5.

A reference voltage is provided with which the voltage across the motor is compared. This reference voltage appears across the terminals 36 and 37 of a high value bridge resistor 38 which in turn is shunted by a capacitor 39. The reference voltage is furnished by means of a reference voltage or auxiliary rectifier indicated generally by the reference character 40 whose positive and negative output terminals are respectively indicated by the reference characters, 41 and 42. The input or A. C. terminals of this rectifier are indicated at 43 and 44 and are connected to opposite ends of the secondary 45 of an isolating transformer indicated generally by the reference character 46. It is to be noted that this isolating transformer has its secondary 45 provided with a series of taps so that secondary adjustments may be made for a purpose hereinafter to appear. The primary of this isolating transformer 46 is indicated by the reference character 47 and has one end connected to the member 28 of the variable power transformer 27 and its other end connected to a tapped secondary 48 of the transformer 10 and through such secondary to one side of the line. The taps in the secondary 48 have factory adjustments whose purposes will hereinafter appear.

It is to be noted that the positive terminal 36 for the reference voltage is connected through the first control winding 4 and through a smoothing choke 49 to one side or brush of the motor 18. The other brush of the motor is connected to the negative terminal 37 of the reference voltage resistor 38 so that the voltage impressed on the motor is in opposition to that of the reference voltage. The adjustments are such so that the reference voltage is always maintained at a higher value than the voltage impressed on the motor.

It would be possible to have a reference voltage exceeded at times by the voltage impressed on the motor but in this event a relatively large resistor 38 would have to be employed so as to provide a small impedance in either direction of current flow. With the arrangement disclosed and described hereinabove it is possible to have a relatively smaller resistor 38 and a relatively smaller rectifier 40.

It will be noted from the description hereinabove and from Figure 1 that the first and second control windings 4 and 5 add positive ampere turns to the saturable reactors 2. The positive ampere turns are to be understood as those which produce a flux in the same direction as that produced by the power windings 3. The bias windings 6, however, add negative ampere turns, that is to say produce a flux in opposition to that of the power windings 3. It has been found that the voltage error windings 4 prevent hunting or periodic uncontrolled variations in the operation of the magnetic amplifier. In other words, the windings 4 are also stabilizing windings.

It is to be noted particularly that a part of the output of the variable power transformer 27 is in series with the primary of the isolating transformer 46 which supplies the reference voltage rectifier or auxiliary rectifier 40 so that the reference voltage is directly and simultaneously controlled with the voltage impressed on the motor, the field windings of the motor remaining at fixed value. In this way, it is possible to control the speed of the motor in a very simple and easy manner by a single control member 28.

Another point of particular interest to be noted, is that the secondary 48 of the first power transformer 10 is adjustable at the factory by selecting the particular tap used. In this way, the minimum voltage impressed on the primary 47 of the isolating transformer 46 is controlled and thus the lower speed ranges of the motor are independently adjustable.

Another point of particular interest, to be noted, is that the secondary 45 of the isolating transformer 46 is adjustable at the factory by selecting the particular tap used. In this way the reference voltage, which is balanced against the voltage across the motor, is determined and thus determines or controls the characteristics at the high speed range.

From the two points immediately above, it is obvious that the low speed and the high speed range of the motor can be independently adjusted by a factory adjustment, and thus the most advantageous characteristics and the flattest speed-torque curves can be selected independently of each other at these two ranges. After the adjustment has once been made it is not further disturbed. The operator merely has to adjust the single control member 28 and thus simultaneously adjust the voltage impressed on the motor and the reference voltage thereby providing a single speed control for the motor without any further thought on his part.

In actual practice it has been found that with high speeds the power transformer furnishes the major part of the energy and that with low speeds the transformer 10 furnishes the major part of the energy through its secondary 9 that is to say through the magnetic amplifier.

In actual practice it has been found that the speed-torque curves both at high speed and at low speed are remarkably flat that is to say there is very little variation of speed throughout a very wide range of loads, for any given or selected setting of the single control member.

Figure 2:
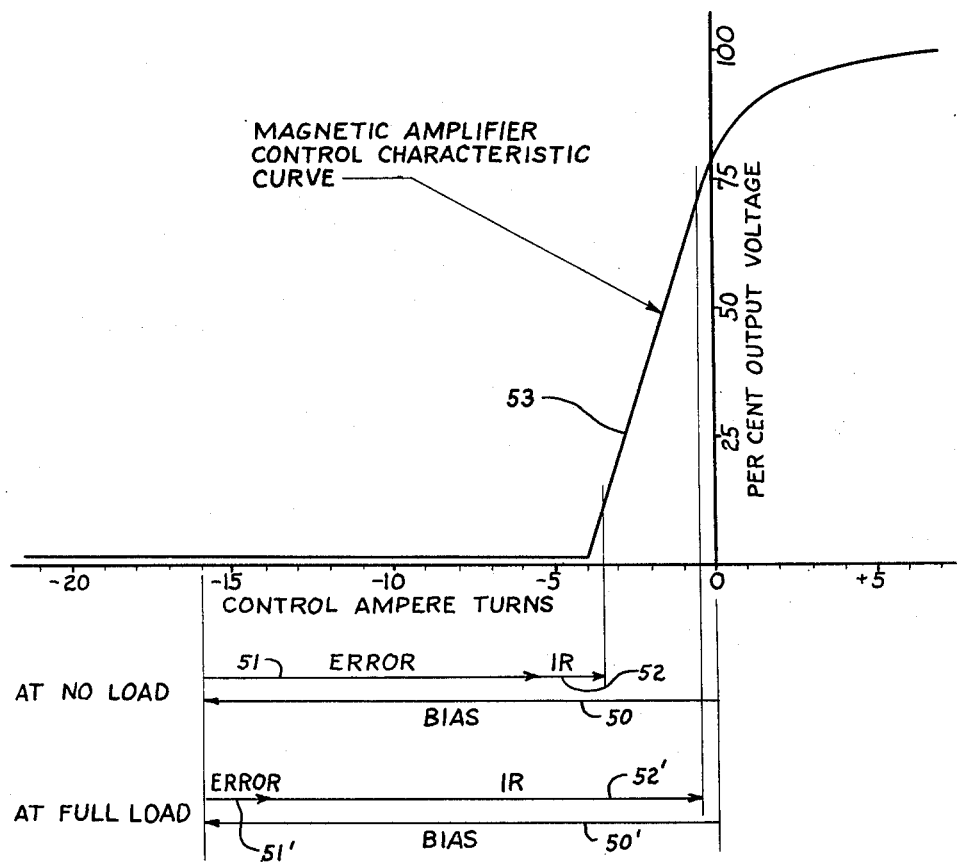
Figure 2 is a view showing the magnetic amplifier control characteristic curve.

Figure 2 shows the characteristic curve of the magnetic amplifier. It will be seen that the bias ampere turns are indicated at 50. These bias ampere turns are negative ampere turns as will be seen from the arrows. The ampere turns due to the first control winding are indicated by the arrows 51 and 51' and are marked "error." In other words, it is the magnetic flux produced by a current proportional to the difference between the reference voltage and the voltage actually impressed on the motor. The "error" flux at very light loads is indicated at 51 and for very heavy loads by the reference character 51'. Similarly, the flux produced by the IR drop which is proportional to the current supplied the motor is indicated by the arrows 52 and 52'. The arrow 52 indicates the condition for light loads and the arrow 52' that for heavy loads. The values of these fluxes have been so chosen that the magnetic amplifier operates in the straight portion 53 of its characteristic curve.

In the form of the invention shown in Figure 3 substantially the same construction is used as that described in connection with Figure 1. However, the magnetic amplifier is so arranged that its saturable reactors jointly deliver alternating current, to the alternating current or input terminals 54 and 55 of a bridge rectifier whose output positive and negative terminals are indicated by the reference characters 56 and 57 respectively. The two saturable reactors of the magnetic amplifier are provided with reversely directed rectifiers 58 and 59 so that each passes a half cycle of the alternating current but in opposite directions. Otherwise, the system shown in Figure 3 is the same as that shown in Figure 1.

Figure 3:
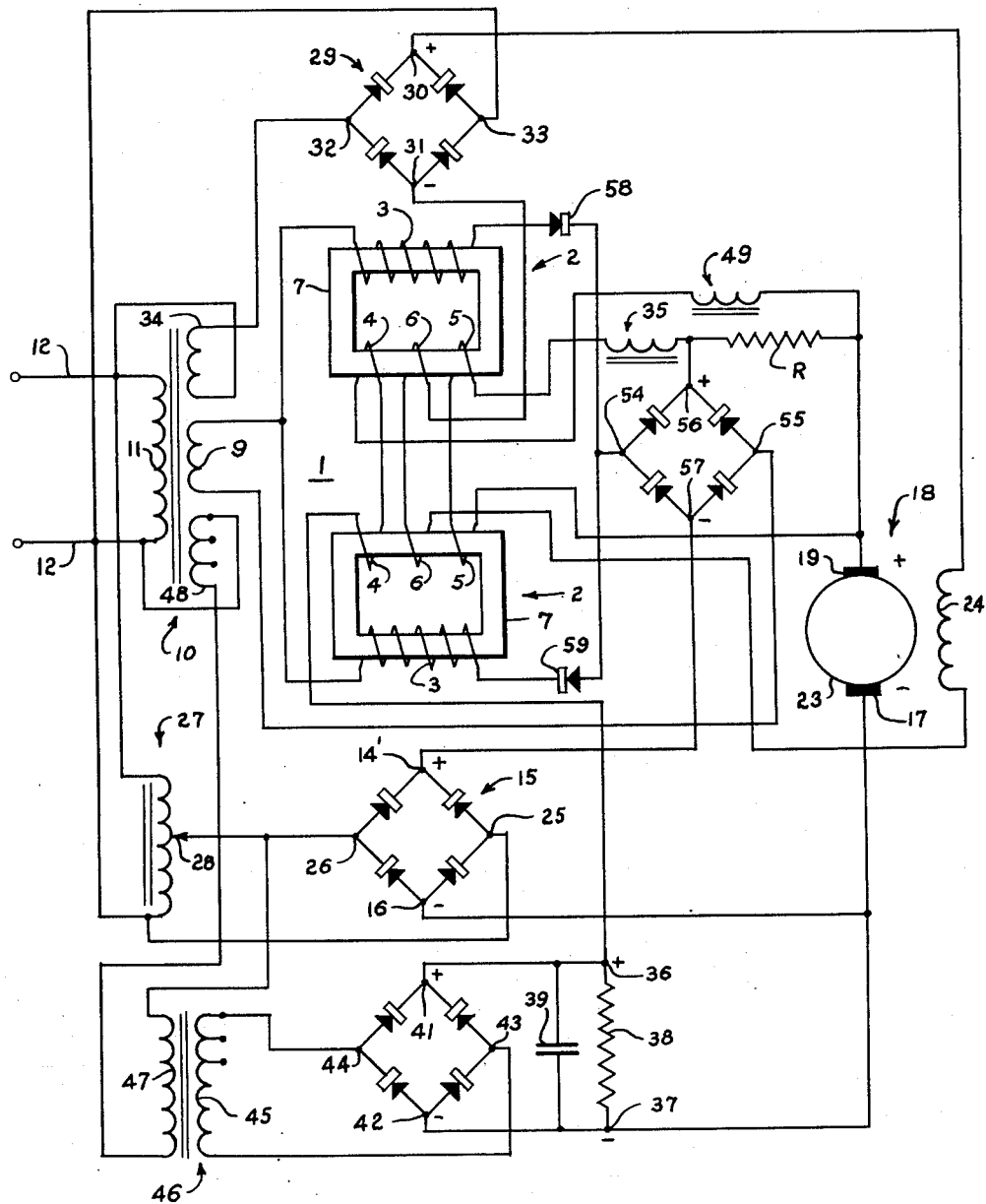
Figure 3 is a view showing a further form that the invention may take such view showing a bridge type rectifier following the magnetic amplifier and also showing a single control means.
Figure 4:
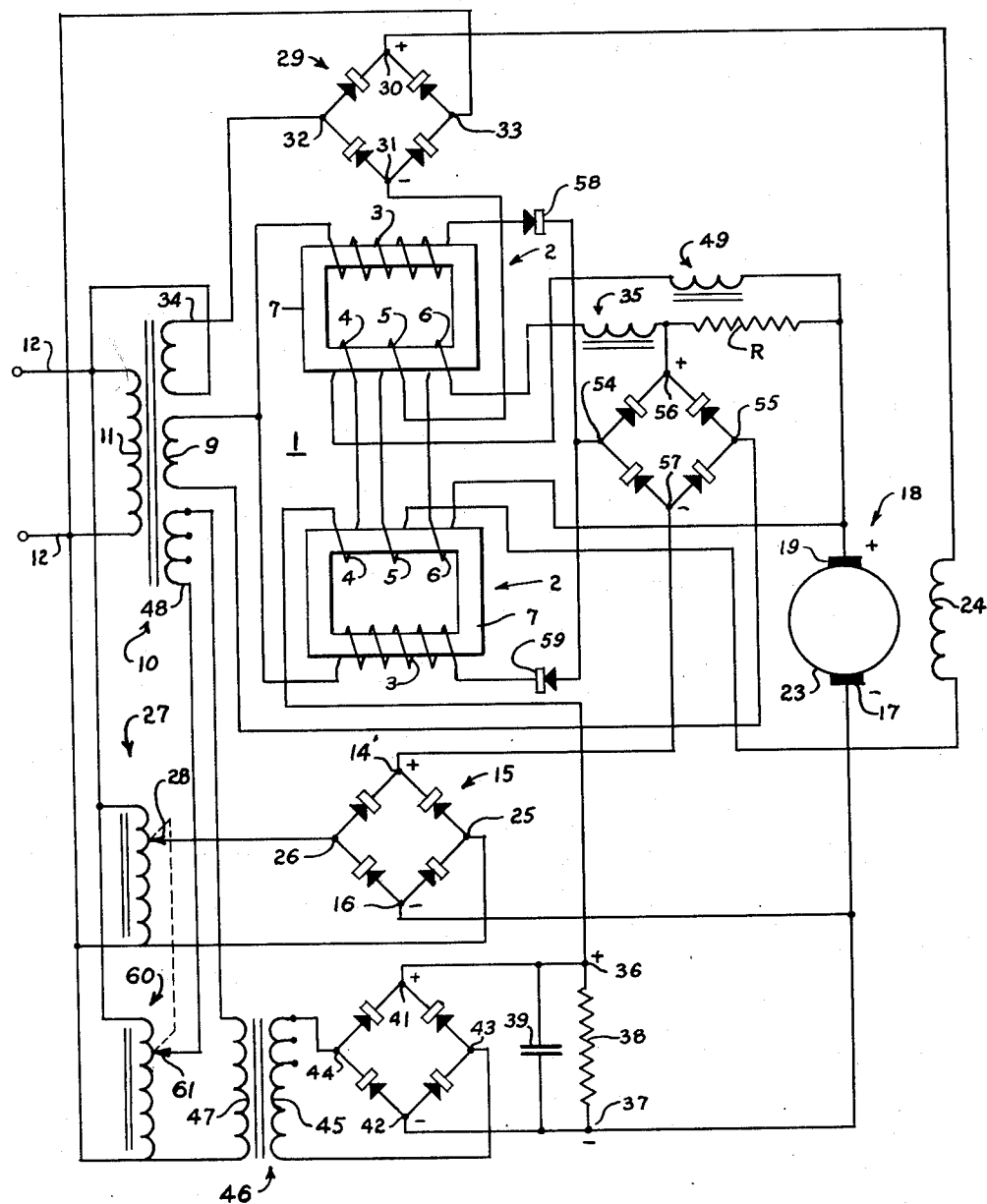
Figure 4 is a view similar to Figure 3 showing a further form of the invention but showing two variable transformers with a single control means.

In the form of the invention shown in Figure 4 substantially the same arrangement as that shown in Figure 3 is employed.

However, two transformers replace the single variable power transformer 27. An auxiliary transformer indicated generally by the reference character 60 is provided and its variable or adjustable member 61 is mechanically connected to the adjustable member 28 of the transformer 27. In this form of the invention the regulation of the transformer 60 is not affected by the regulation of the transformer 27. It is still, however, as is apparent from the above description and from the disclosure of Figure 4, a single control for regulating both the voltage supplied the motor and the reference voltage.

Figure 5:
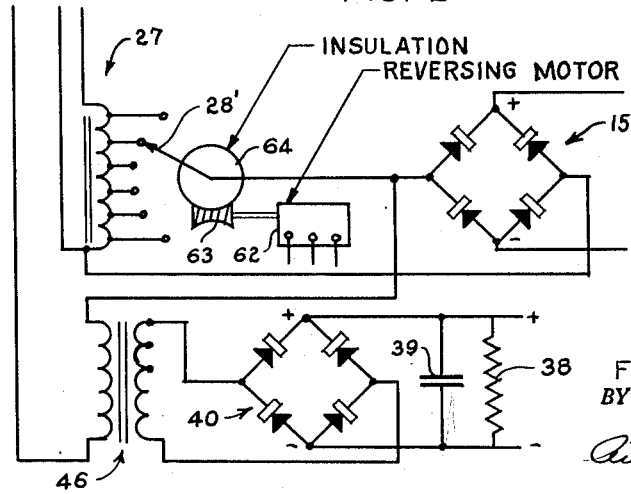
Figure 5 is a fragmentary view showing a further form of single control means such view corresponding to the lower portion of Figure 1.

Figure 5 shows the lower portion of Figure 1 modified slightly. The modification consists in providing a reversible motor means such for example as the reversible motor 62 for controlling the movable member 28' which corresponds to the movable member 28 of Figure 1 for the transformer 27. The motor 62 is arranged to drive the member 28' in either direction to the appropriate point of adjustment by any suitable reduction gear means such for example as the worm and worm wheel 63 and 64, respectively. The worm wheel 64 is preferably made of insulating material.

It is to be noted that the magnetic amplifiers are so arranged that they correspond to different signals, one of which is proportional to the difference between the reference voltage and the voltage impressed on the motor and the other of which is proportional to the current flowing through the armature of the motor. In addition to this, a device responsive to a third signal such as the motor 62 of Figure 5 is provided in this form of the invention and shown so as to place the single control member under the control of automatic means responsive to any desired signal.

It will be seen that a novel motor control means has been provided which does not employ electronic tubes, which does not require a warm-up period but instead may be instantly started and which is rugged and sturdy and which will stand great overloads for relatively extensive periods as has been set forth in detail hereinabove.

Further, it will be seen that the device is not damaged by wide variations in line voltage nor by material changes in ambient temperature.

Further, it will be seen that the motor control devices disclosed by this invention are so arranged that a single control means is employed for simultaneously controlling both the voltage impressed on the motor and the reference voltage so that the operator merely adjusts one knob or member to secure the desired speed.

Although this invention has been described in considerable detail, it is to be understood that such description is intended as illustrative rather than limiting, as the invention may be variously embodied and is to be interpreted as claimed.

I claim:

1. A motor control device comprising a single stage magnetic amplifier including a saturable reactor having a power winding and a control winding, a direct current motor connected to said power winding, an alternating current source for supplying current to said motor through said power winding, rectifying means for rectifying current supplied to said motor, a source of direct current reference voltage, said control winding being responsive to the difference between said reference voltage and the voltage impressed on said motor, and a single control means controlling said reference voltage and said alternating current source.

2. A motor control device comprising a single stage magnetic amplifier including a saturable reactor having a power winding and a control winding, a direct current motor connected to said power winding, a first alternating current source for supplying current to said motor through said power winding, a second alternating current source for supplying current to said motor, rectifying means for rectifying current supplied to said motor, a source of direct current reference voltage, said control winding being responsive to the difference between said reference voltage and the voltage impressed on said motor, and a single control means controlling said reference voltage and said second alternating current source.

3. A motor control device comprising a magnetic amplifier including a saturable reactor having a power winding and a control winding, a direct current motor connected to said power winding, an alternating current source for supplying current to said motor through said power winding, a variable power transformer for supplying current to said motor, rectifying means for rectifying current supplied to said motor, a source of direct current reference voltage, said control winding being responsive to the difference between said reference voltage and the voltage impressed on said motor, and a single control means controlling said reference voltage and said variable power transformer.

4. A motor control device comprising a magnetic amplifier including a saturable reactor having a power winding and a control winding, a direct current motor connected to said power winding, an alternating current source for supplying current to said motor through said power winding, a variable power transformer for supplying current to said motor, rectifying means for rectifying current supplied to said motor, a source of direct current reference voltage, said control winding being responsive to the difference between said reference voltage and the voltage impressed on said motor, and a single control means controlling said reference voltage and said variable power transformer, the output side of said variable power transformer and the power winding of said saturable reactor being connected in series relation.

5. A motor control device comprising magnetic amplifier means including saturable reactor means having a power winding and a first and a second control winding, a direct current motor connected to said power winding, an alternating current source for supplying current to said motor through said power winding, a variable power transformer for supplying current to said motor, rectifying means for rectifying current supplied to said motor, a source of direct current reference voltage, said first control winding being responsive to the difference between said reference voltage and the voltage impressed on said motor and said second control winding being responsive to the value of the current supplied said motor, and a single control means for controlling said reference voltage and said variable power transformer.

6. A motor control device comprising a magnetic amplifier including saturable reactor means having a power winding and a first and a second control winding, a direct current motor having its armature connected to said power winding and having a field winding, an alternating current source for supplying current to said armature through said power winding, a variable power transformer for supplying current to the armature of said motor, rectifying means for rectifying current supplied to the armature of said motor, a second alternating current source and a rectifier therefore for supplying current to the field winding of said motor, a source of direct current reference voltage, said first control winding being responsive to the difference between said reference voltage and the voltage impressed on said motor and said second control winding being responsive to the value of the current supplied said motor, and a single control means for controlling said reference voltage and said variable power transformer.

7. A motor control device comprising magnetic amplifier means including saturable reactor means having a power winding and a first and a second control winding and a bias winding, means for supplying direct current to said bias winding, a direct current motor connected to said power winding, an alternating current source for supplying current to said motor through said power winding, a variable power transformer for supplying current to said motor, rectifying means for rectifying current supplied to said motor, a source of direct current reference voltage, said first control winding being responsive to the difference between said reference voltage and the voltage impressed on said motor and said second control winding being responsive to the value of the current supplied said motor, and a single control means for controlling said reference voltage and said variable power transformer.

8. A motor control device comprising magnetic amplifier means including saturable reactor means having a power winding and a first and a second control winding and a bias winding, means for supplying direct current to said bias winding, a direct current motor connected to said power winding, an alternating current source for supplying current to said motor through said power winding, a variable power transformer for supplying current to said motor, rectifying means for rectifying current supplied to said motor, a source of direct current reference voltage, said first control winding being responsive to the difference between said reference voltage and the voltage impressed on said motor and said second control winding being responsive to the value of the current supplied said motor, and a single control means for controlling said reference voltage and said variable power transformer, the flux produced by said control winding being maintained in the opposite direction from the flux produced by said bias winding.

9. A motor control device comprising magnetic amplifier means including saturable reactor means having a power winding and a first and a second control winding and a bias winding, means for supplying direct current to said bias winding, a direct current motor connected to said power winding, an alternating current source for supplying current to said motor through said power winding, a variable power transformer for supplying current to said motor, rectifying means for rectifying current supplied to said motor, a source of direct current reference voltage, said first control winding being responsive to the difference between said reference voltage and the voltage impressed on said motor and said second control winding being responsive to the value of the current supplied said motor, and a single control means for controlling said reference voltage and said variable power transformer, the flux produced by said bias winding being maintained in the opposite direction from that produced by said first and second control windings.

10. A motor control device comprising magnetic amplifier means including saturable reactor means having a power winding and a first and a second control winding, a direct current motor connected to said power winding, an alternating current source for supplying current to said motor through said power winding, a variable power transformer for supplying current to said motor, rectifying means for rectifying current supplied to said motor, a second rectifying means, a separate source of alternating current in series relation with a part of the output from said variable power transformer and connected to said second rectifying means for supplying a direct current reference voltage, said first control winding being responsive to the difference between said reference voltage and the voltage impressed on said motor and said second control winding being responsive to the value of the current supplied said motor, and a single control means for controlling said reference voltage and said variable power transformer.

11. A motor control device comprising magnetic amplifier means including saturable reactor means having a power winding and a first and a second control winding, a direct current motor connected to said power winding, an alternating current source for supplying current to said motor through said power winding, variable power transformer means for supplying current to said motor, rectifying means for rectifying current supplied to said motor, an isolating transformer having a primary and a secondary, a second power transformer having an adjustable secondary, both the adjustable secondary of said second power transformer and the primary of said isolating transformer being in series relation with a part of the output from said variable power transformer, auxiliary rectifying means supplied from the secondary of said isolating transformer for supplying a direct current reference voltage, said first control winding being responsive to the difference between said reference voltage and the voltage impressed on said motor and said second control winding being responsive to the value of the current supplied said motor, and a single control means for controlling said reference voltage and said variable power transformer.

12. A motor control device comprising magnetic amplifier means including saturable reactor means having a power winding and a first and a second control winding, a direct current motor connected to said power winding, an alternating current source for supplying current to said motor through said power winding, variable power transformer means for supplying current to said motor, rectifying means for rectifying current supplied to said motor, an isolating transformer having a primary and an adjustable secondary, a second power transformer having an adjustable secondary, both the adjustable secondary of said second power transformer and the primary of said isolating transformer being in series relation with a part of the output from said variable power transformer, auxiliary rectifying means supplied from the secondary of said isolating transformer for supplying a direct current reference voltage, said first control winding being responsive to the difference between said reference voltage and the voltage impressed on said motor and said second control winding being responsive to the value of the current supplied said motor, and a single control means for controlling said reference voltage and said variable power transformer.

13. A motor control device comprising magnetic amplifier means including saturable reactor means having a power winding and a first and a second control winding, a direct current motor connected to said power winding, an alternating current source for supplying current to said motor through said power winding, a variable power transformer for supplying current to said motor, rectifying means for rectifying current supplied to said motor, a source of direct current reference voltage, said first control winding being responsive to a signal voltage corresponding to the difference between said reference voltage and the voltage impressed on said motor and said second control winding being responsive to a signal voltage corresponding to the value of the current supplied said motor, and a single manual control means for controlling said reference voltage and said variable power transformer.

14. A motor control device comprising magnetic amplifier means including saturable reactor means having a power winding and a first and a second control winding, a direct current motor connected to said power winding, an alternating current source for supplying current to said motor through said power winding, a variable power transformer for supplying current to said motor, rectifying means for rectifying current supplied to said motor, a source of direct current reference voltage, said first control winding being responsive to a signal voltage corresponding to the difference between said reference voltage and the voltage impressed on said motor and said second control winding being responsive to a signal voltage corresponding to the value of the current supplied said motor, a single automatic control means for controlling said reference voltage and said variable power transformer, and motor means responsive to a third signal voltage for operating said single automatic control means.

References Cited in the file of this patent

UNITED STATES PATENTS

| Number | Name | Date |
|---|---|---|
| 2,482,101 | Cooper | Sept. 20, 1949 |
| 2,555,992 | Ogle | June 5, 1951 |
| 2,558,094 | King | June 26, 1951 |
| 2,622,239 | Bracutt | Dec. 16, 1952 |
| 2,652,525 | Nichols et al. | Sept. 15, 1953 |